(12) United States Patent
Ohtsuka

(10) Patent No.: US 11,070,733 B2
(45) Date of Patent: Jul. 20, 2021

(54) IMAGING APPARATUS

(71) Applicant: Panasonic Intellectual Property Management Co., Ltd., Osaka (JP)

(72) Inventor: Yoshio Ohtsuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/840,515

(22) Filed: Apr. 6, 2020

(65) Prior Publication Data

US 2020/0329204 A1 Oct. 15, 2020

(30) Foreign Application Priority Data

Apr. 11, 2019 (JP) .............................. JP2019-075559

(51) Int. Cl.
*H04N 5/232* (2006.01)

(52) U.S. Cl.
CPC ... *H04N 5/232933* (2018.08); *H04N 5/23227* (2018.08); *H04N 5/232411* (2018.08); *H04N 5/232939* (2018.08)

(58) Field of Classification Search
CPC ....... H04N 5/232933; H04N 5/232411; H04N 5/232939; H04N 5/23227; H04N 5/23209
See application file for complete search history.

(56) References Cited

U.S. PATENT DOCUMENTS

| 6,031,999 | A | * | 2/2000 | Ogawa | ..................... G03B 7/26 396/277 |
| 7,084,921 | B1 | * | 8/2006 | Ogawa | .................. G06F 1/3203 348/372 |
| 2008/0315840 | A1 | | 12/2008 | Mori | |
| 2009/0028527 | A1 | * | 1/2009 | Jang | ....................... H04N 5/782 386/224 |
| 2013/0135509 | A1 | * | 5/2013 | Fuji | .................... H04N 5/23293 348/333.02 |
| 2014/0132802 | A1 | * | 5/2014 | Ohtsuka | ............ H04N 1/00389 348/231.4 |
| 2016/0253187 | A1 | * | 9/2016 | Kim | ..................... G06F 9/4893 719/320 |
| 2017/0142339 | A1 | * | 5/2017 | Kim | ................. H04N 5/232935 |
| 2017/0249006 | A1 | * | 8/2017 | Tu | ......................... G06F 1/3287 |

FOREIGN PATENT DOCUMENTS

| JP | 2006-115293 A | 4/2006 |
| JP | 2008-288943 A | 11/2008 |
| JP | 2013-115670 A | 6/2013 |

* cited by examiner

*Primary Examiner* — Timothy J Henn
(74) *Attorney, Agent, or Firm* — Renner, Otto, Boisselle & Sklar, LLP

(57) ABSTRACT

An imaging apparatus that can be mounted with at least one battery, for capturing an object image to generate image data, includes: an operation member configured to receive an operation of a user; a display configured to display information on a setting of the imaging apparatus; and a processor configured to control the display based on a user operation input to the operation member, wherein the imaging apparatus has a plurality of functions to be executed using power of the battery, and the processor causes the display to display attention information indicating whether the plurality of functions include an inexecutable function due to an insufficient remaining capacity of the battery, when a predetermined operation is input to the operation member in a state where the plurality of functions are not executed.

10 Claims, 11 Drawing Sheets

Fig. 6

|  |  | BODY BATTERY | | |
|---|---|---|---|---|
|  |  | Sc | Sb | Sa |
| BG BATTERY | Sa | A | A | A |
| | Sb | B | A | A |
| | Sc | C | B | A |

IMAGING APPARATUS

BACKGROUND

1. Technical Field

The present disclosure relates to an imaging apparatus operable with power from at least one battery.

2. Related Art

JP 2008-288943 A discloses a technique for automatically selecting and using one battery from a plurality of batteries in a portable electronic device such as a digital camera. The imaging apparatus of JP 2008-288943 A includes a back monitor and a battery housing capable of accommodating, for example, two batteries. This imaging apparatus detects a remaining revel of each of the two batteries in the battery housing, and automatically selects a single battery for use as the power source. Then, the remaining battery level information of the currently utilized battery is displayed in a normal manner on the back monitor as a display for identifying the automatically selected battery, while the remaining battery level information of an unselected battery is displayed in grayed-out fashion. Consequently, the currently utilized battery that is automatically extracted from the plurality of batteries can be easily identified.

SUMMARY

The present disclosure provides an imaging apparatus capable of making it easy for a user to grasp a function of the imaging apparatus restricted in accordance with a remaining capacity of a battery.

An imaging apparatus according to the present disclosure is mounted with at least one battery, for capturing an object image to generate image data. The imaging apparatus includes an operation member, a display, and a processor. The operation member is configured to receive an operation of a user. The display is configured to display information on settings of the imaging apparatus. The processor is configured to control the display on the basis of a user operation input to the operation member. The imaging apparatus has a plurality of functions to be executed using battery power. The processor causes the display to display attention information indicating whether the plurality of functions include an inexecutable function due to an insufficient remaining capacity of the battery, when a predetermined operation is input to the operation member in a state where the plurality of functions are not executed.

According to the imaging apparatus of the present disclosure, it is possible to make it easy for a user to grasp a function of the imaging apparatus restricted in accordance with a remaining capacity of the battery, by displaying attention information.

BRIEF DESCRIPTION OF THE DRAWINGS

FIG. 6 is a table for explaining a state of functional restriction of the digital camera;

DETAILED DESCRIPTION

Hereinafter, embodiments will be described in detail with reference to the drawings as needed. However, explanation more detailed than necessary may be omitted. For example, detailed descriptions of well-known matters and redundant explanations for substantially the same configuration may be omitted. This is to avoid unnecessary redundancy of the following description and to facilitate understanding by those skilled in the art. It is to be noted that the inventor(s) provides the accompanying drawings and the following description in order to enable those skilled in the art to fully understand the present disclosure, and does not intend to limit the claimed subject matter by them.

Hereinafter, embodiments will be described in detail with reference to the drawings.

First Embodiment

Hereinafter, a digital camera according to an embodiment will be described with reference to the drawings.

1. Configuration

Hereinafter, a configuration of the digital camera will be described with reference to the drawings.

1-1. Configuration of Digital Camera

Figure 1:
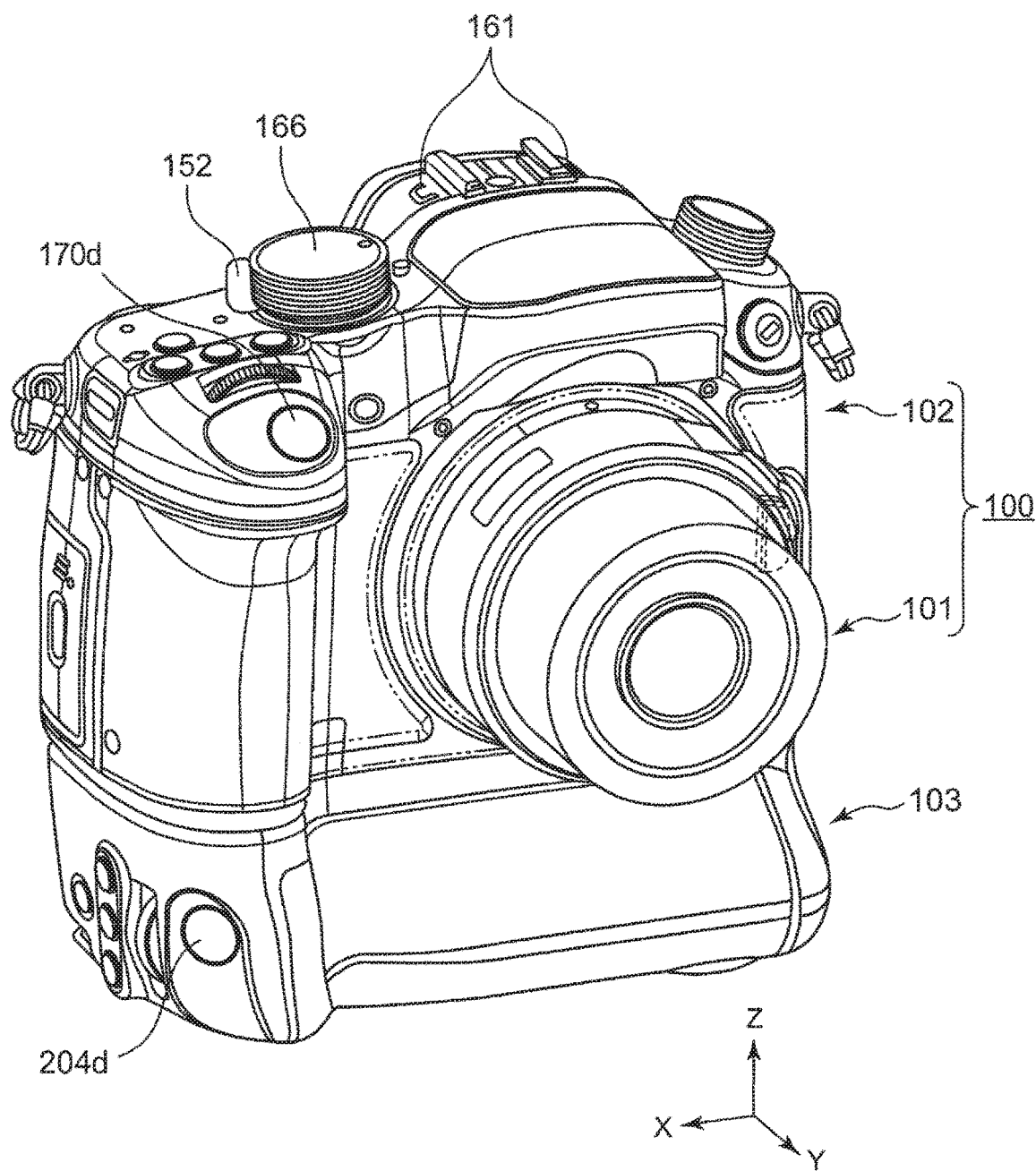
FIG. 1 is a perspective view from the front of a digital camera of a first embodiment.
Figure 2:
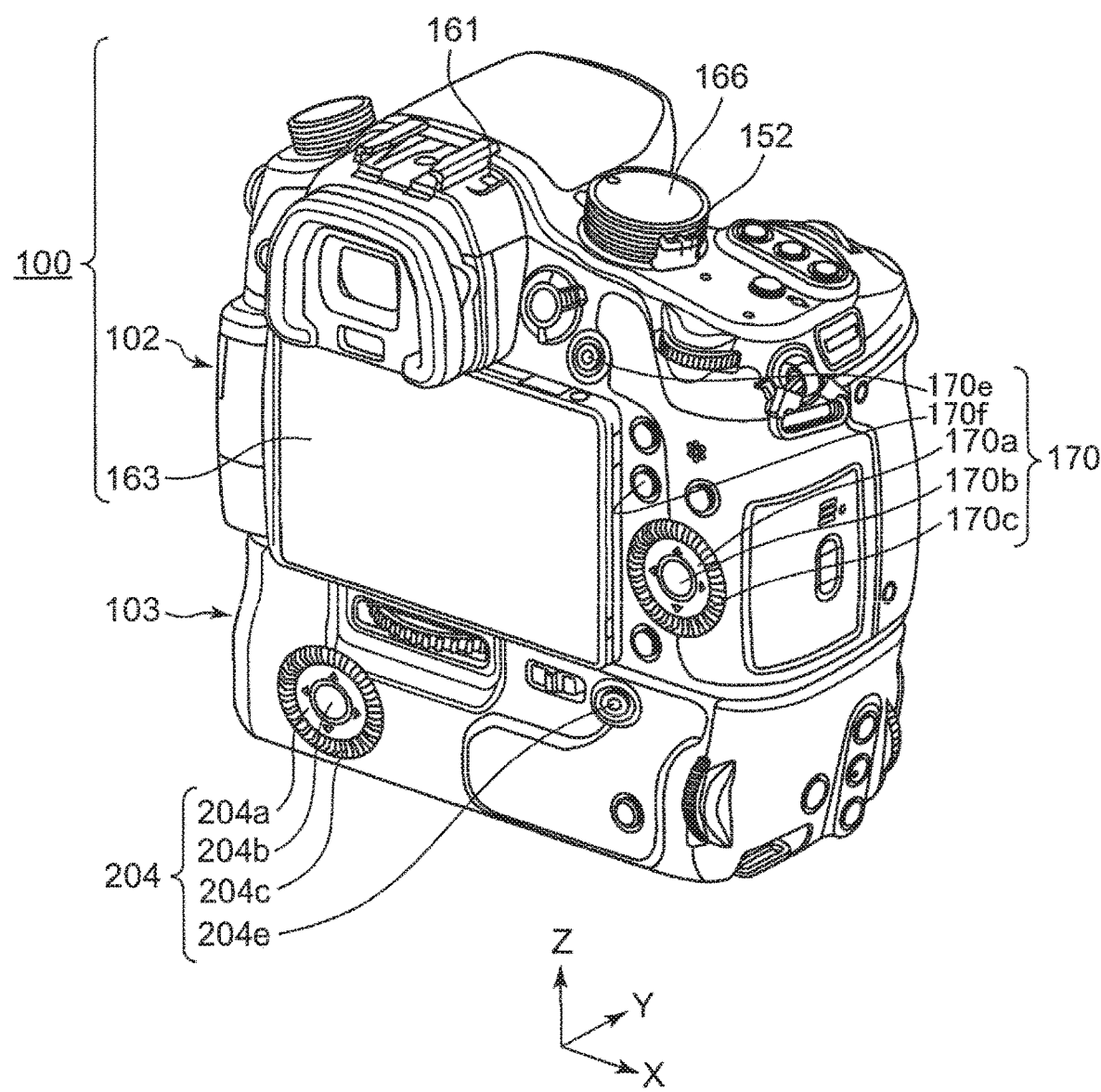
FIG. 2 is a perspective view from the back of the digital camera of the first embodiment.

FIG. 1 is a perspective view from the front of a digital camera 100 according to a first embodiment. FIG. 2 is a perspective view from the back of the digital camera 100 according to the first embodiment. The digital camera 100 includes a camera body 102 and an interchangeable lens 101. Further, the digital camera 100 is mounted with a battery grip 103, which is an external battery device, on a lower surface of the camera body 102, for example.

Figure 3:
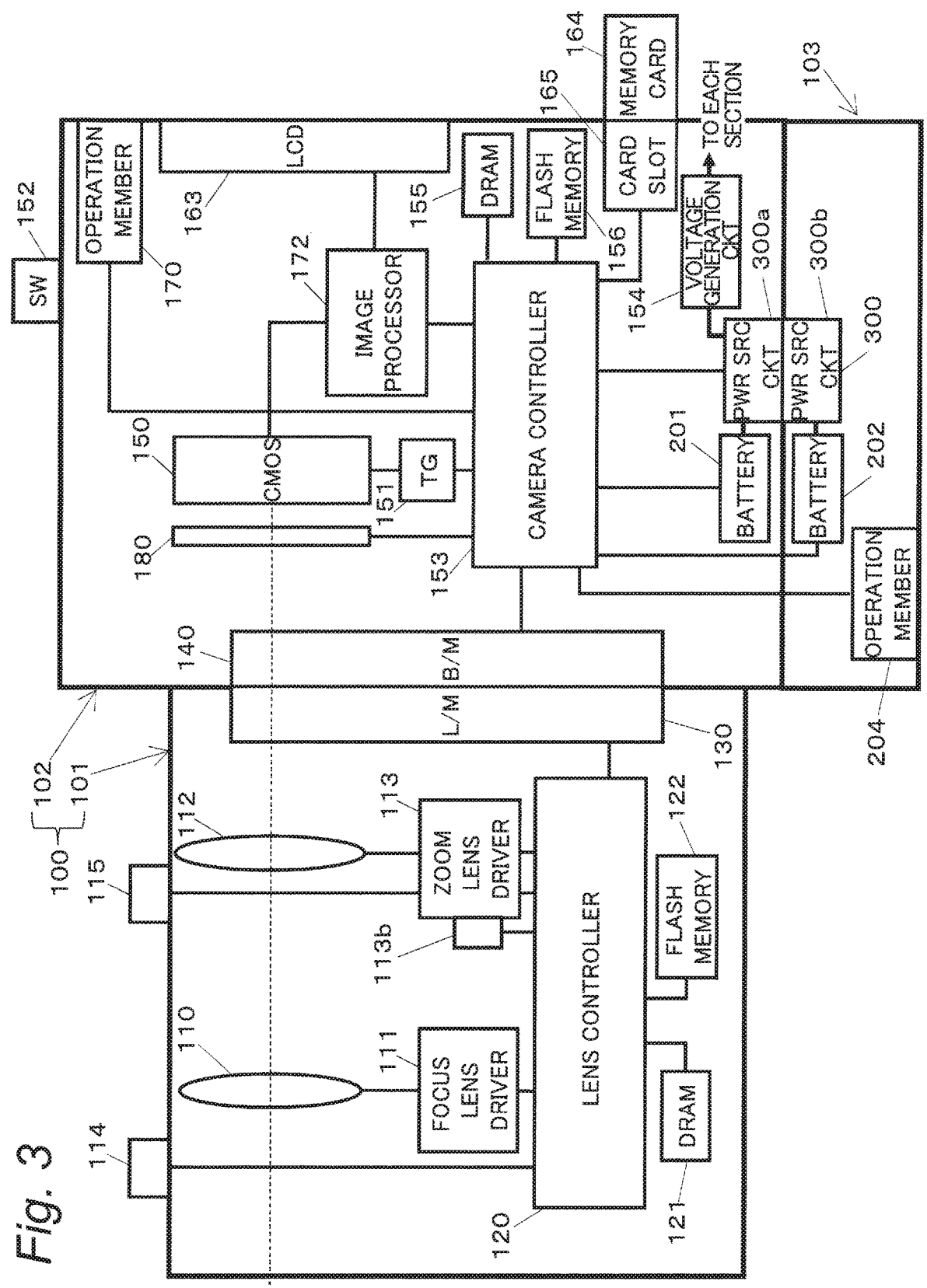
FIG. 3 is a block diagram showing an electrical configuration of the digital camera of the first embodiment.

FIG. 3 is a block diagram showing an electrical configuration of the digital camera 100 according to the first embodiment. The digital camera 100 includes the camera body 102, and the interchangeable lens 101 that can be mounted to the camera body 102. The removable battery grip 103 is mounted to the camera body 102. The interchangeable lens 101 has a zoom lens 112 driven by a zoom lens driver 113. The camera body 102 can electrically drive the zoom lens 112 via a lens controller 120. That is, the interchangeable lens 101 is an electrically-powered zoom lens.

The camera body 102 can be removably mounted with a battery 201 (hereinafter referred to as "body battery 201"), and has a power supply selection circuit 300a. The battery grip 103 can be mounted with a battery 202 (hereinafter referred to as "BG battery 202"), and includes a power supply selection circuit 300b. The power supply selection circuit 300a and the power supply selection circuit 300b form a power supply selection circuit 300. The camera body 102 can control the power supply selection circuit 300 by a camera controller 153. That is, the camera body 102 can select which of the body battery 201 and the BG battery 202 is to be used, or both of them to be used. Each section of the digital camera 100 is an example of a load unit in the present embodiment.

1-2. Configuration of Camera Body

As shown in FIG. 3, the camera body 102 includes a CMOS image sensor 150, a LCD monitor 163, an image processor 172, a timing generator (TG) 151, the camera controller 153, a body mount 140, an operation member 170, the body battery 201, the power supply selection circuit 300a, a power switch 152, a voltage generation circuit 154, a DRAM 155, a flash memory 156, a card slot 165, and a shutter 180.

The camera controller 153 controls an overall operation of the digital camera 100 by controlling each section of the digital camera 100 such as the CMOS image sensor 150, in accordance with an operation signal or the like from an operation member such as the operation member 170.

For example, the camera controller 153 transmits a vertical synchronization signal to the timing generator 151. In parallel with the transmission of the vertical synchronization signal, the camera controller 153 generates an exposure synchronization signal on the basis of the vertical synchronization signal. The camera controller 153 periodically and repeatedly transmits the generated exposure synchronization signal to the lens controller 120 via the body mount 140 and a lens mount 130. This allows the camera controller 153 to control a lens such as a focus lens 110 in the interchangeable lens 101 to be synchronized with timing of exposure.

The camera controller 153 uses the DRAM 155 as a work memory at a time of a control operation and an image processing operation. The camera controller 153 may be configured by a hard-wired electronic circuit, or may be configured by a microcomputer or the like that executes a program. In addition, the camera controller 153 may be configured as one semiconductor chip together with the image processor 172 and the DRAM 155, or may be configured as a separate semiconductor chip.

The CMOS image sensor 150 is configured to include a light receiving element, a gain control amplifier (AGC), and an AD converter. The light receiving element converts an optical signal collected by the interchangeable lens 101 into an electric signal, to generate image information. Further, the AGC amplifies an electrical signal output from the light receiving element. The AD converter converts an electrical signal output from the AGC into a digital signal.

The CMOS image sensor 150 operates at timing controlled by the timing generator 151. Operations of the CMOS image sensor 150 controlled by the timing generator 151 include an imaging operation for a still image, an imaging operation for a through image, a data transfer operation, an electronic shutter operation, and the like. The through image is mainly a moving image, and is displayed on the LCD monitor 163 in order for a user to determine a composition for capturing a still image. The CMOS image sensor 150 outputs the generated image information to the image processor 172. Meanwhile, instead of the CMOS image sensor 150, another imaging element such as an NMOS image sensor or a CCD image sensor may be used.

The image processor 172 performs predetermined image processing on image data converted into a digital signal by the AD converter in the CMOS image sensor 150. For example, the predetermined image processing includes gamma correction processing, white balance correction processing, flaw correction processing, YC conversion processing, digital zoom processing, compression processing, expansion processing, and the like, but is not limited thereto.

The LCD monitor 163 is a display disposed on a back surface of the camera body 102. The LCD monitor 163 displays an image indicated by display image information processed by the image processor 172. The LCD monitor 163 can selectively display a moving image and a still image. The LCD monitor 163 can also display an image for notifying the user of information such as setting conditions of the digital camera 100. In the present embodiment, the camera body 102 includes the LCD monitor 163 as an example of the display, but the display is not limited to this. For example, the camera body 102 may include an OLED display as a display.

The flash memory 156 stores programs and parameters to be used when the camera controller 153 performs control.

The card slot 165 is a connection means that enables a memory card 164 to be mounted to the camera body 102. The card slot 165 can connect the memory card 164 electrically and mechanically. The card slot 165 may have a function of controlling the memory card 164.

The memory card 164 is an external memory that is internally provided with a storage element such as a flash memory. The memory card 164 can store data such as image information processed by the camera controller 153. Further, the memory card 164 can output data such as image information stored therein. The image data read out from the memory card 164 is processed by the camera controller 153 or the image processor 172, and displayed on the LCD monitor 163, for example. In the present embodiment, the memory card 164 is shown as an example of the external memory, but the external memory is not limited to this. For example, a recording medium such as an optical disc can be used as the external memory.

The body mount 140 can be mechanically and electrically connected to the lens mount 130 (described later) of the interchangeable lens 101. The body mount 140 can transfer data between the camera body 102 and the interchangeable lens 101 via the lens mount 130. The body mount 140 transmits an exposure synchronization signal and other control signals received from the camera controller 153, to the lens controller 120 via the lens mount 130. Further, the body mount 140 transmits a signal received from the lens controller 120 via the lens mount 130, to the camera controller 153.

The body battery 201 supplies power for driving the digital camera 100. The body battery 201 may be, for example, a dry battery or a rechargeable battery. Further, instead of the battery, power supplied from outside through a power cord may be supplied to the digital camera 100. A power supply of the digital camera 100 is switched between on and off by the power switch 152 being operated by the user. When the power supply is turned on, the camera controller 153 supplies power to each section in the camera body 102. Further, the camera controller 153 also supplies power to the interchangeable lens 101 via the body mount 140 and the lens mount 130. Then, in the interchangeable lens 101, power is supplied to each section of the interchangeable lens 101 by the lens controller 120.

The power supply selection circuit 300a of the camera body 102 forms a portion of the power supply selection circuit 300. The power supply selection circuit 300 selects a power supply for supplying power to the digital camera 100, from one or both of the body battery 201 included in the camera body 102 and the BG battery 202 included in the battery grip 103. The power supply selection circuit 300 outputs power from the selected power supply to the voltage generation circuit 154. The power supply selection circuit 300 is controlled by the camera controller 153.

The power supply selection circuit 300a on the camera body 102 side includes, for example, a detection circuit that detects a remaining capacity of the body battery 201. The detection circuit includes, for example, a voltage-dividing resistor circuit connected between a positive electrode and a negative electrode of the body battery 201. The power supply selection circuit 300a generates a detection signal indicating a detection result of a remaining capacity of the body battery 201, such as a divided voltage, to output the detection signal to the camera controller 153.

The voltage generation circuit 154 includes a DC/DC converter, a regulator, and the like, to supply power from the power supply selection circuit 300 to each section (load unit) of the digital camera 100. The voltage generation circuit 154 converts a voltage supplied from the power supply into a voltage suitable for each section when supplying power to each section.

The operation member 170 is a generic term of hard keys such as an operation button and an operation lever provided on the exterior of the digital camera 100, to receive an operation by the user. Further, the operation member 170 includes, for example, a touch panel that receives a touch operation on the display of the LCD monitor 163. When receiving an operation by the user, the operation member 170 transmits an operation signal corresponding to the user operation, to the camera controller 153.

As shown in FIG. 2, the operation member 170 includes a cross button 170a capable of receiving operation instruction in up, down, left, and right directions, for example. When the interchangeable lens 101 having an electric zoom function is mounted to the camera body 102, the camera controller 153 individually assigns functions as zoom operation buttons to a left button and a right button of the cross button 170a. For example, the camera controller 153 assigns a function as a zoom operation button in a wide-end side direction to the left button, and assigns a function as a zoom operation button in a tele-end side direction to the right button. In the case that the interchangeable lens 101 having the electric zoom function and mounted on the camera body 102 has a zoom lever for the user to perform a zoom operation, the camera controller 153 does not necessarily have to assign the function as the zoom operation button to the operation member 170.

The operation member 170 includes a menu button 170b to display various setting menus on the LCD monitor 163. To the menu button 170b, a function as a determination button to determine a setting in various setting menus may be assigned by the camera controller 153. The operation member 170 includes a rotary dial 170c in addition to the cross button 170a, as means to perform various settings. The user can use the cross button 170a or the rotary dial 170c of the operation member 170 to select menu items and enter parameter values in the setup menu on the LCD monitor 163.

When the setup menu is displayed and the camera controller 153 detects an operation by the user on the cross button 170a, the menu button 170b, the rotary dial 170c, or other control, the camera controller 153 changes the display accordingly. For example, the camera controller 153 changes the screen displayed on the LCD monitor 163 to a setup menu at a deeper level in the menu hierarchy than the setup menu already displayed. The user can then select the desired settings for various menu items displayed on the setup menu after the transition.

A mode selection switch 166 is disposed on the top of the camera body 102. The mode selection switch 166 is a switch for selecting either a recording standby mode of displaying the moving image signal output from the CMOS image sensor 150 on the LCD monitor 163 via the image processor 172, or a playback mode of reproducing a still image or a moving image recorded on the memory card 164.

The operation member 170 includes a still image release button 170d (FIG. 1) for starting recording of a still image. The still image release button 170d receives an operation of an image command or an auto-focus command from the user. The still image release button 170d has two operating positions by half press and full press. For example, when the still image release button 170d is pressed halfway by the user, the camera controller 153 performs an auto-focus operation. When the still image release button 170d is fully pressed by the user, the camera controller 153 records image data generated at timing of the full-press operation on the memory card 164.

The operation member 170 includes a moving image release button 170e (FIG. 2) to start and end recording of a moving image. When the moving image release button 170e is pressed while no moving image is recorded, the digital camera 100 starts a recording operation of a moving image. When the moving image release button 170e is pressed while a moving image is recorded, the digital camera 100 ends the recording operation of the moving image.

Furthermore, the operation member 170 includes a function button 170f (hereinafter referred to as "Fn button 170f") provided together with the LCD monitor 163 as shown in FIG. 2, for example. The Fn button 170f is assigned with, for example, a function for checking a remaining capacity of each of the batteries 201 and 202.

Returning to FIG. 3, the shutter 180 adjusts an exposing time (exposure time) of light incident on the CMOS image sensor 150. The shutter 180 is driven by a drive system such as a DC motor or a stepping motor, for example, in accordance with a control signal issued from the camera controller 153. For example, the camera controller 153 can control a driving speed (shutter speed or continuous-shooting speed) at which the shutter 180 is driven.

1-3. Configuration of Interchangeable Lens

As shown in FIG. 3, the interchangeable lens 101 includes the focus lens 110, a focus lens driver 111, a focus ring 114, the zoom lens 112, the zoom lens driver 113, a zoom ring 115, and the lens controller 120, a DRAM 121, a flash memory 122, and the lens mount 130. The interchangeable lens 101 may further include a camera shake correction lens in addition to the lenses shown in FIG. 3.

The lens controller 120 controls an overall operation of the interchangeable lens 101. The lens controller 120 may be configured by a hard-wired electronic circuit, or may be configured by a microcomputer or the like that executes a program.

The DRAM 121 functions as a work memory to be used when the lens controller 120 performs control. The flash memory 122 stores programs, parameters, lens data, and the like to be used in control by the lens controller 120. The lens data includes characteristic values unique to the interchangeable lens 101, such as a lens name, a lens ID, a serial number, an F number, and a focal distance. As described later, the lens controller 120 can notify the camera controller 153 with lens data, and the camera controller 153 can execute various control operations in accordance with the lens data.

The zoom lens 112 is a lens to change magnification of an object image formed by an optical system of the interchangeable lens 101. The zoom lens 112 may be composed of any number of lenses or any number of groups of lenses.

The zoom lens driver 113 is a mechanical mechanism that moves the zoom lens 112 along the optical axis of the optical system on the basis of an operation of the zoom ring 115 by the user. A position of the zoom lens 112 is detected by a zoom lens position detector 113b at any time, and notified to the lens controller 120.

The focus lens 110 is a lens to change a focus state of an object image that is incident from the optical system and formed on the CMOS image sensor 150. The focus lens 110 may be composed of any number of lenses or any number of groups of lenses.

The focus ring 114 is provided on the exterior of the interchangeable lens 101. When the focus ring 114 is operated by the user, information on an operation amount of the focus ring 114 is notified to the lens controller 120. The lens controller 120 controls the focus lens driver 111 to drive the focus lens 110 on the basis of the notified information on the operation amount of the focus ring 114. For this reason, the lens controller 120 recognizes a position of the focus lens 110.

The focus lens driver 111 drives the focus lens 110 to move forward or backward along the optical axis of the optical system, on the basis of the control by the lens controller 120. The focus lens driver 111 can be realized by, for example, a stepping motor, a DC motor, an ultrasonic motor, or the like.

1-4. Configuration of Battery Grip

As shown in FIG. 3, the battery grip 103 includes the BG battery 202, the power supply selection circuit 300b, and an operation member 204.

The BG battery 202 supplies power for driving the digital camera 100. The battery 202 may be, for example, a dry battery or a rechargeable battery. Further, instead of the battery, power supplied from outside through a power cord may be supplied to the digital camera 100.

The power supply selection circuit 300b on the battery grip 103 side forms a portion for connecting the BG battery 202 from the battery grip 103 side to the camera body 102 side in the power supply selection circuit 300. The power supply selection circuit 300b is controlled by the camera controller 153. The power supply selection circuit 300b includes, for example, a detection circuit that detects a remaining capacity of the BG battery 202, similarly to the detection circuit for the remaining capacity of the body battery 201. The power supply selection circuit 300b generates a detection signal indicating a detection result of a remaining capacity of the BG battery 202, to output the detection signal to the camera controller 153.

The operation member 204 includes, as shown in FIG. 2, a cross button 204a capable of receiving operation instruction in up, down, left, and right directions, and a rotary dial 204c capable of clockwise and counterclockwise rotational operations. When the interchangeable lens 101 having an electric zoom function is mounted to the camera body 102, the camera controller 153 individually assigns functions as zoom operation buttons to a left button and a right button of the cross button 204a. For example, the camera controller 153 assigns a function as a zoom operation button in a wide-end side direction to the left button, and assigns a function as a zoom operation button in a tele-end side direction to the right button. In the case that the interchangeable lens 101 having the electric zoom function and mounted on the camera body 102 has a zoom lever for the user to perform a zoom operation, the camera controller 153 does not necessarily have to assign the function as the zoom operation button to the operation member 204.

In a view from the camera back, the cross button 204a, the rotary dial 204c, and other buttons of the operation member 204 of the battery grip 103 are disposed in an arrangement rotated 90 degrees clockwise around the optical axis of the interchangeable lens 101 of the digital camera 100 from the operation member 170 of the camera body 102. As a result, action of the user holding the camera body 102 to operate shooting a still image at a horizontal position (a position of the digital camera 100 in which the Z axis in FIG. 1 faces upward), and action the user holding the battery grip 103 to operate shooting a still image in a vertical position (a position of the digital camera 100 in which the X axis in FIG. 1 faces upward) are substantially the same. Therefore, the operation in the case of holding the battery grip 103 can be similar with in the case of holding the camera body 102, and usability for the user can be improved.

For example, the operation member 204 of the battery grip 103 further includes a menu button 204b, a rotary dial 204c, and a still image release button 204e similar to those of the operation member 170 of the camera body 102. In addition, the operation member 204 of the battery grip 103 may include an operation member similar to the mode selection switch or the like.

2. Operation

Hereinafter, an operation of the digital camera 100 configured as described above will be described.

2-1. Outline of Operation

The digital camera 100 according to the present embodiment has a plurality of shooting functions, that is, functions for capturing an object image to generate image data. The various shooting functions of the digital camera 100 include a high-load shooting function executed using significantly large power (for example, 15 W or more), and a low-load shooting function that is executable with smaller power.

The high-load shooting functions include, for example, a high-quality movie shooting function for shooting a moving image with high quality such as 4K or 8K, and a high-speed continuous shooting function for continuously shooting still images at a continuous-shooting speed equal to or more than a predetermined value (for example, 10 images/second). The low-load shooting functions include, for example, a movie shooting function with lower image quality (for example, FHD or HD) than a high-quality moving image, a medium-speed or low-speed continuous shooting function for continuously shooting at a continuous-shooting speed lower than the above predetermined value, a still-image shooting function in which continuous shooting is not particularly performed, and the like. In addition, a live view function, in which image data of an imaging result is not particularly saved, is also executed with relatively small power.

The digital camera 100 can set to assign an operation for starting/ending a shooting function desired by the user to each section such as the operation member 170 by the user operation using a menu screen of the LCD monitor 163. For example, a function of shooting a certain moving image such as 4K moving image or FHD moving image is set to the moving image release button 170e (FIG. 2). Furthermore, a shooting function such as high-speed continuous shooting or low-speed continuous shooting can be set to the still image release button 170d (FIG. 1).

Figure 4:
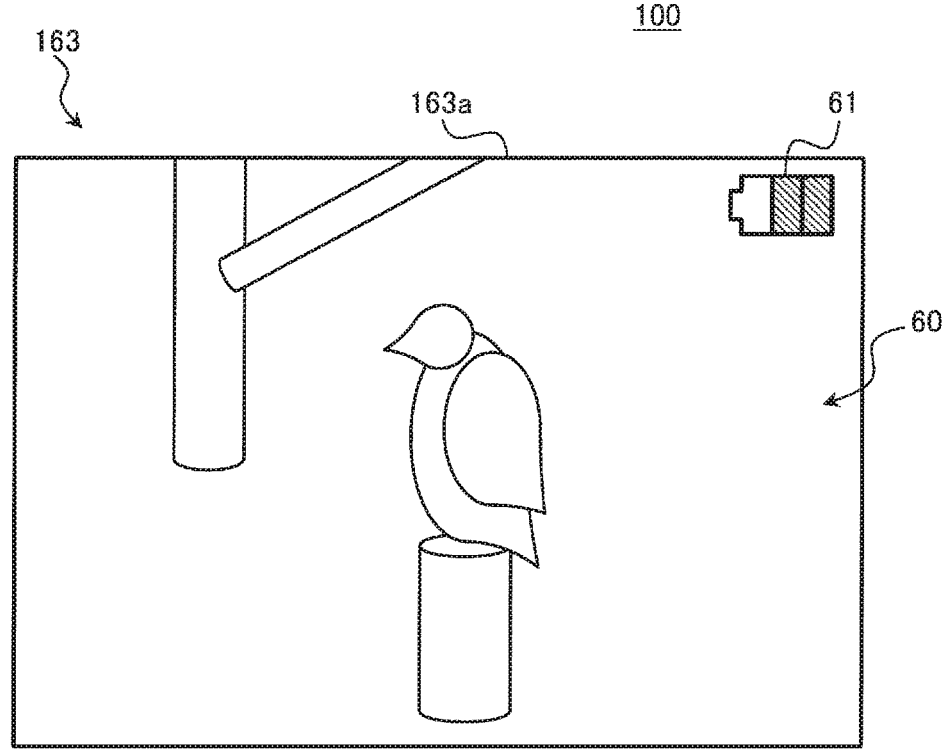
FIG. 4 is a view showing a display example of a live view function in the digital camera.

FIG. 4 shows a display example of the live view function in the digital camera 100. In the live view function, the LCD monitor 163 displays a through image 60 on a display screen 163a. For example, the user of the digital camera 100 watches the through image 60 on the LCD monitor 163 and waits for a photo opportunity to execute a shooting function using some means set in advance as described above.

The digital camera 100 according to the present embodiment displays a battery icon 61 on the display screen 163a at the live view as illustrated in FIG. 4. The battery icon 61 in this example indicates a remaining capacity of the body battery 201. In the present embodiment, no icon for indicating a remaining capacity of the BG battery 202 is displayed on the live view display screen 163a. This can reduce the number of displayed icons, and avoid complication of the display screen 163a.

The digital camera 100 according to the present embodiment can supply power from the body battery 201 and the BG battery 202. This makes it possible to prolong a period in which the high-load shooting function and the like can be executed, or to downsize the batteries 201 and 202. For functional restriction that disables execution of a specific shooting function, the above icon display or the like might have a problem that the user cannot grasp the functional restriction even if the functional restriction occurs due to an insufficient remaining capacity of the BG battery 202, for example. In such a situation, the user would notice the desired shooting function to be not executable only after the user would press the release button 170d or 170e upon the long-awaited photo opportunity. Then, the user would miss the photo opportunity.

In order to solve such a problem, the digital camera 100 according to the present embodiment provides a user interface that allows the user to confirm before shooting whether the functional restriction occurs according to a remaining capacity of each of the batteries 201 and 202. Hereinafter, an operation of the digital camera 100 of the present embodiment will be described in detail.

2-2. Details of Operation

Figure 5:
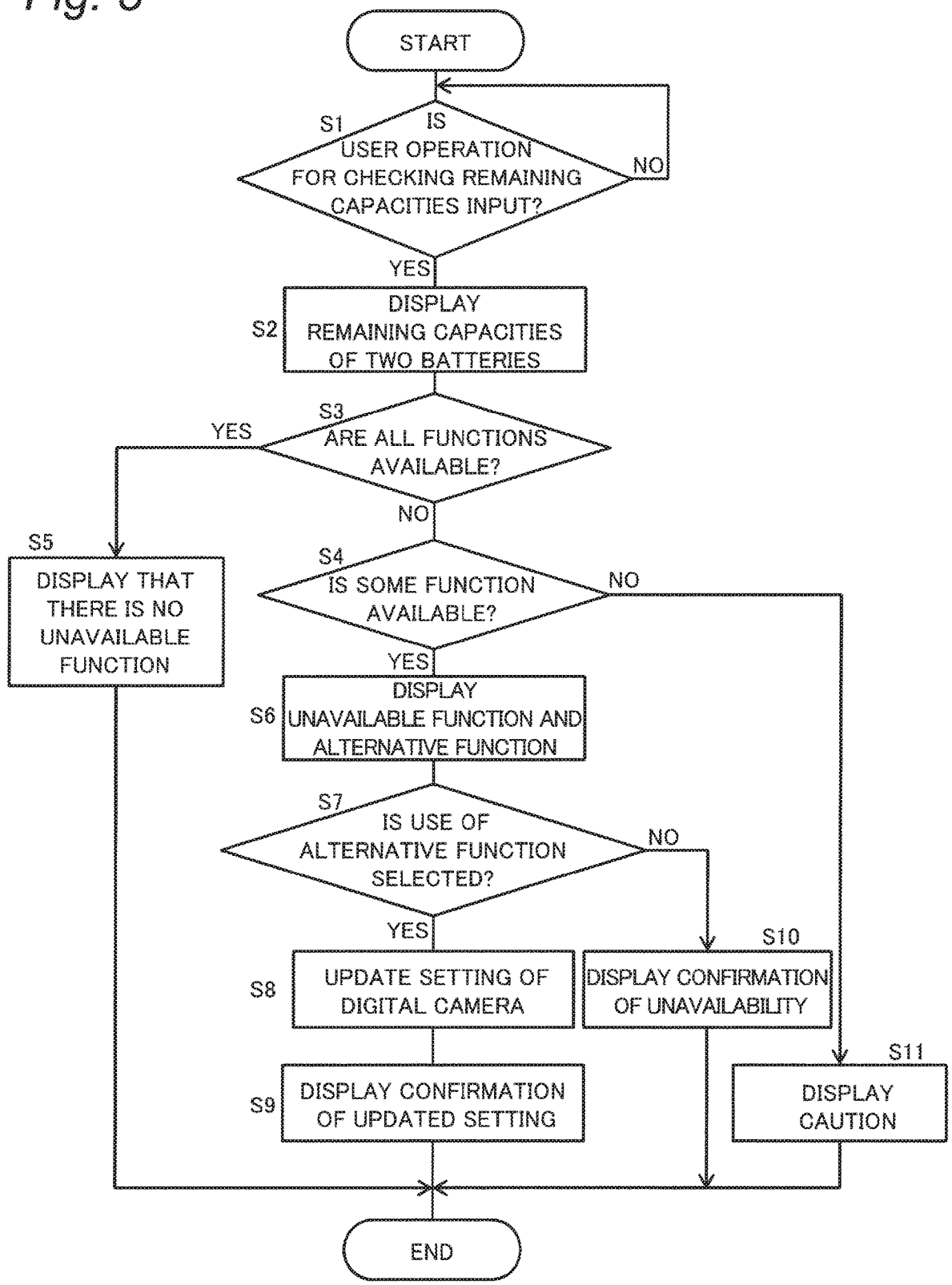
FIG. 5 is a flowchart for explaining processing at confirmation of functional restriction in the digital camera according to the first embodiment.

Details of the operation of the digital camera 100 will be described with reference to FIGS. 5 to 11. FIG. 5 is a flowchart for explaining processing at confirmation of functional restriction in the digital camera 100 according to the present embodiment.

The flowchart shown in FIG. 5 is started, for example, while the digital camera 100 executes the live view function. Each process shown in this flowchart is executed by the camera controller 153, for example. In the following, a description is given to a processing example in a case where the 4K movie shooting function is set in advance for the moving image release button 170e and the high-speed continuous shooting function is set in advance for the still image release button 170d.

At first, the camera controller 153 detects whether or not the user operation for checking remaining capacities of both the batteries 201 and 202 is input in the operation member 170, for example (S1). The user operation for checking the remaining capacity is performed, for example, by pressing the Fn button 170f (FIG. 2). When the user operation for checking the remaining capacity is not performed (NO in S), the user can grasp a remaining capacity of the body battery 201 by the battery icon 61 (FIG. 4).

When detecting an input of the user operation for checking the remaining capacity (YES in S1), the camera controller 153 acquire a current remaining capacity of each of the batteries 201 and 202 by a detection signal from the power supply selection circuit 300, for example (S2). Then, the camera controller 153 controls the LCD monitor 163 to display the remaining capacity of both batteries 201 and 202, for example (see FIG. 7 and the like).

On the basis of the current remaining capacity of each of the batteries 201 and 202, the camera controller 153 determines whether all the shooting functions of the digital camera 100 are available or unavailable, or some function is only unavailable (S3, S4). States for functional restriction of the digital camera 100 will be described with reference to FIG. 6.

FIG. 6 illustrates a table for classifying a combination of remaining capacities of the batteries 201 and 202 in the digital camera 100 into three states A, B, and C. State A is a state where a remaining capacity is sufficient for all shooting functions in the digital camera 100 to be available. State B is a state where the remaining capacity is insufficient for just some shooting function in all the shooting functions to execute, and only the some shooting function is unavailable. State C is a state where the remaining capacity is further insufficient, and all the shooting functions are unavailable. Such information indicating the table above is stored in advance in the flash memory 156, for example.

In the example of FIG. 6, a remaining capacity of each of the batteries 201 and 202 is managed with three stages Sa, Sb, and Sc. Between stage Sa having the largest remaining capacity and the next stage Sb, a threshold value is set based on a remaining capacity presumed to be insufficient for executing a specific shooting function (e.g. 7.2 V). This threshold value may correspond to a remaining capacity that allows a high-quality movie shooting function such as 4K, to only record for 30 seconds or less, for example. This threshold value also may correspond to a remaining capacity that is unable to drive the shutter 180 more than once at a continuous-shooting speed with the high-speed continuous shooting function.

Furthermore, between the above stage Sb and stage Sc having the smallest remaining capacity, another threshold value is set as smaller than the threshold value between stages Sa and Sb, in view of a remaining capacity presumed to be used to stop the shooting function under execution (for example, 6.2 V). The camera controller 153 manages stages Sa to Sc of the remaining capacity of each of the batteries 201 and 202 individually on the basis of the threshold judgement with each threshold value.

Returning to FIG. 5, the camera controller 153 refers to, for example, the table (FIG. 6) stored in the flash memory 156, to determine which one of states A, B, and C is a state corresponding to the current stage Sa, Sb, or Sc of the remaining capacity of each of the batteries 201 and 202 (S3, S4).

Figure 7:
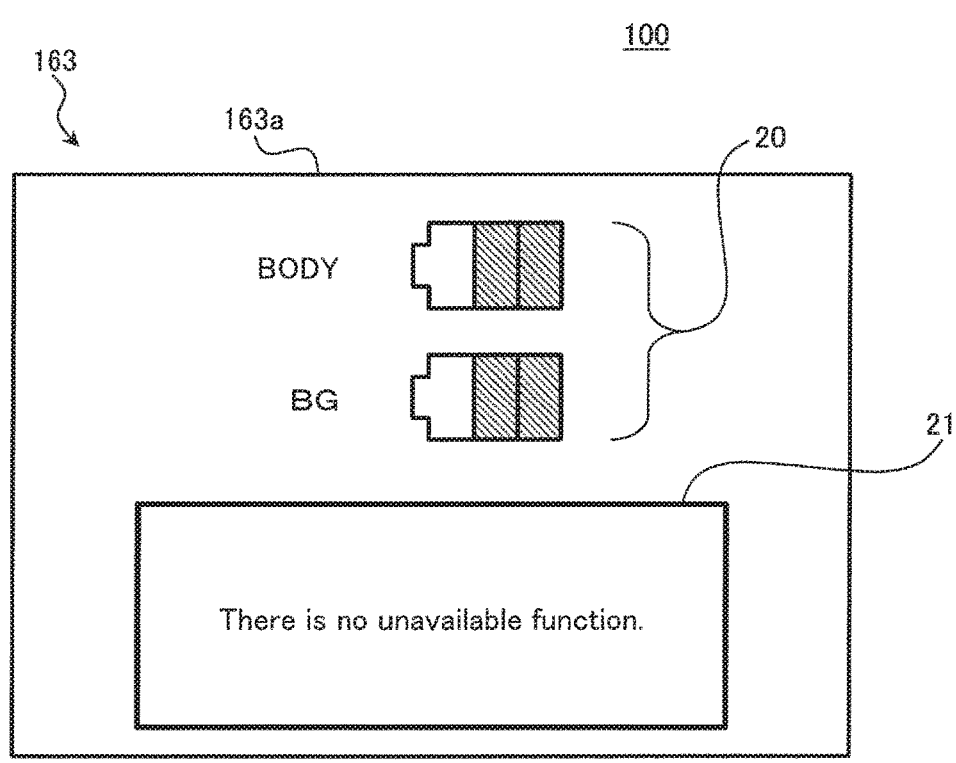
FIG. 7 is a view showing a display example in a state where all functions of the digital camera are available.

When determining that the digital camera 100 is in state A where all functions are available (YES in S3), the camera controller 153 causes the LCD monitor 163 to display information indicating that there is no function which is currently unavailable (S5). FIG. 7 shows a display example of step S5. In this example, the LCD monitor 163 displays a message 21 "There is no unavailable function", together with a remaining capacity indicator 20 (S2) indicating the remaining capacity of each of the two batteries 201 and 202.

On the other hand, when the digital camera 100 is not in state A where all functions are available (NO in S3) but some function is available (YES in S4), the state corresponds to state B where some function is unavailable. In this case, the camera controller 153 causes the LCD monitor 163 to display information indicating that there is an unavailable function (S6). A display example of step S6 is shown in FIG. 8.

Figure 8:
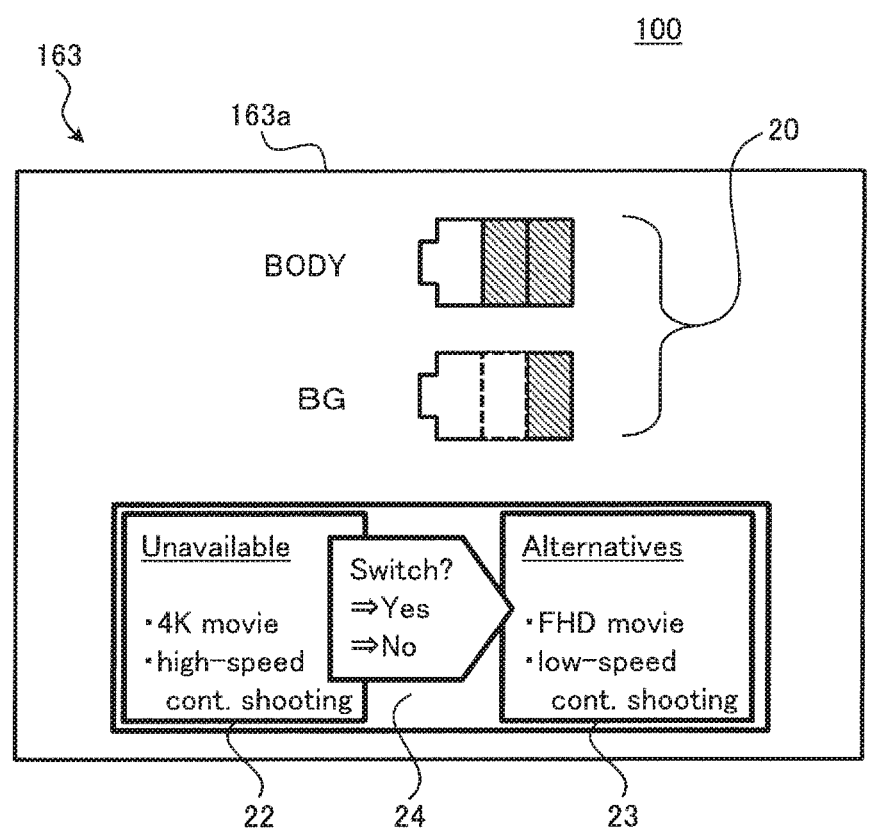
FIG. 8 is a view showing a display example in a state where some function of the digital camera is unavailable.

In the example of FIG. 8, under control by the camera controller 153, the LCD monitor 163 displays an unavailable function list 22, an alternative function list 23, and a switching operation icon 24 (S6) together with the remaining capacity indicator 20 of the two batteries 201 and 202 (S2).

The unavailable function list 22 is a list indicating shooting functions that are unavailable in the current state of the digital camera 100. The unavailable function list 22 in the example of FIG. 8 enumerates "4K movie" and "high-speed continuous shooting" as shooting functions that are unavailable in state B.

The alternative function list 23 is a list indicating alternative functions, that is, shooting functions which can be used instead of the shooting function indicated by the unavailable function list 22. The alternative function list 23 in this example enumerates "FHD movie" as an alternative function of "4K movie", and "low-speed continuous shooting" as an alternative function of "high-speed continuous shooting".

The switching operation icon 24 is an operation icon to allow the user to select whether or not to use the alternative function of the alternative function list 23 instead of the shooting function listed in the unavailable function list 22. In the switching operation icon 24 of this example, selection of "Yes" or "No" corresponds to whether or not to switch the individual functions in the unavailable function list 22 to the individual alternative functions collectively.

With regard to the process of step S6 in FIG. 5, information which associates a shooting function unavailable in state B with each alternative function is stored in advance in the flash memory 156, for example. At step S6, the camera controller 153 controls display of the unavailable function list 22, the alternative function list 23, and the like with reference to the above information.

The camera controller 153 receives the user operation on the switching operation icon 24 displayed in step S6 via the operation member 170, to determine whether or not the use of the alternative function is selected instead of the unavailable shooting function (S7). For example, when the user selects "Yes" in the switching operation icon 24 in the example of FIG. 8, the camera controller 153 proceeds to "YES" in step S7. The user's selection operation on the switching operation icon 24 is input via a button such as the cross button 170a or a touch panel, for example.

When determining that the use of the alternative function is selected in the user's selection operation (YES in S7), the camera controller 153 updates the setting of the digital camera 100 in accordance with this operation (S8). Here, in updating setting of the digital camera 100 in accordance with this operation, the updated setting is recorded as data in the DRAM 155 or the flash memory 156. The recorded data may be held or may not be held when the digital camera 100 is turned off. In the case that the recorded data are held, the setting updated in step S8 is retained when the digital camera 100 is turned on again. As exemplified in FIG. 9, the camera controller 153 causes the LCD monitor 163 to display a confirmation message 25 or the like (S9).

Figure 9:
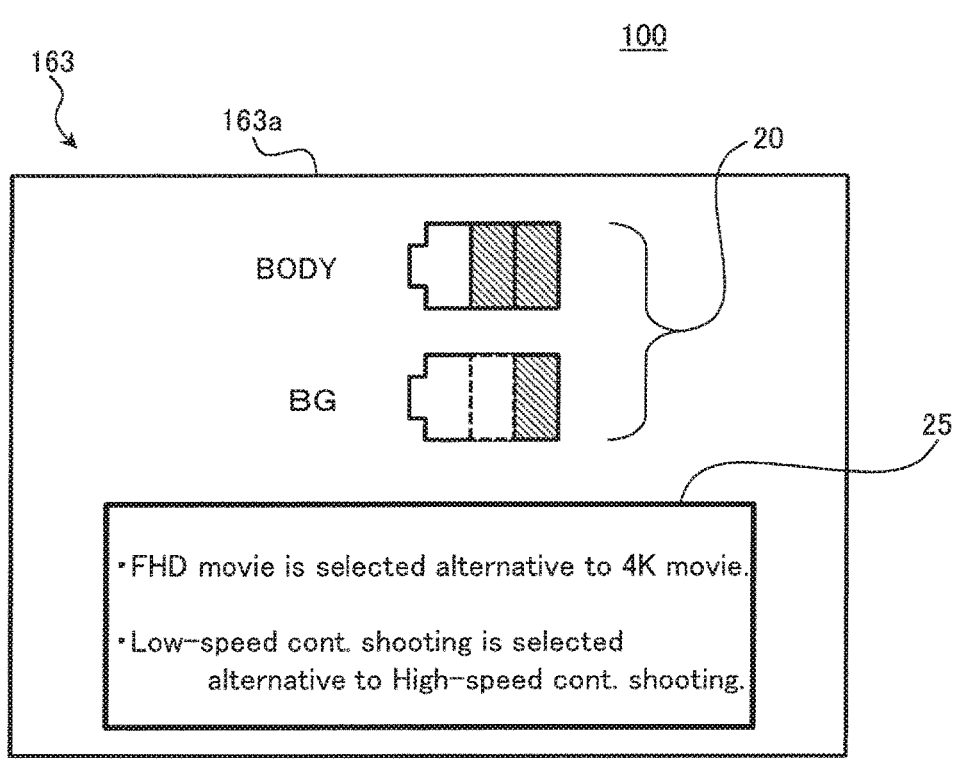
FIG. 9 is a view showing a display example when an alternative function of the digital camera is selected.

FIG. 9 illustrates a case where "Yes" is selected in the switching operation icon 24 in the example of FIG. 8. In accordance with such a user's selection operation, the camera controller 153 changes the shooting function assigned to the moving image release button 170e from "4K moving image" to "FHD moving image", and changes the shooting function assigned to the still image release button 170d from "high-speed continuous shooting" to "low-seed continuous shooting" (S8).

Figure 10:
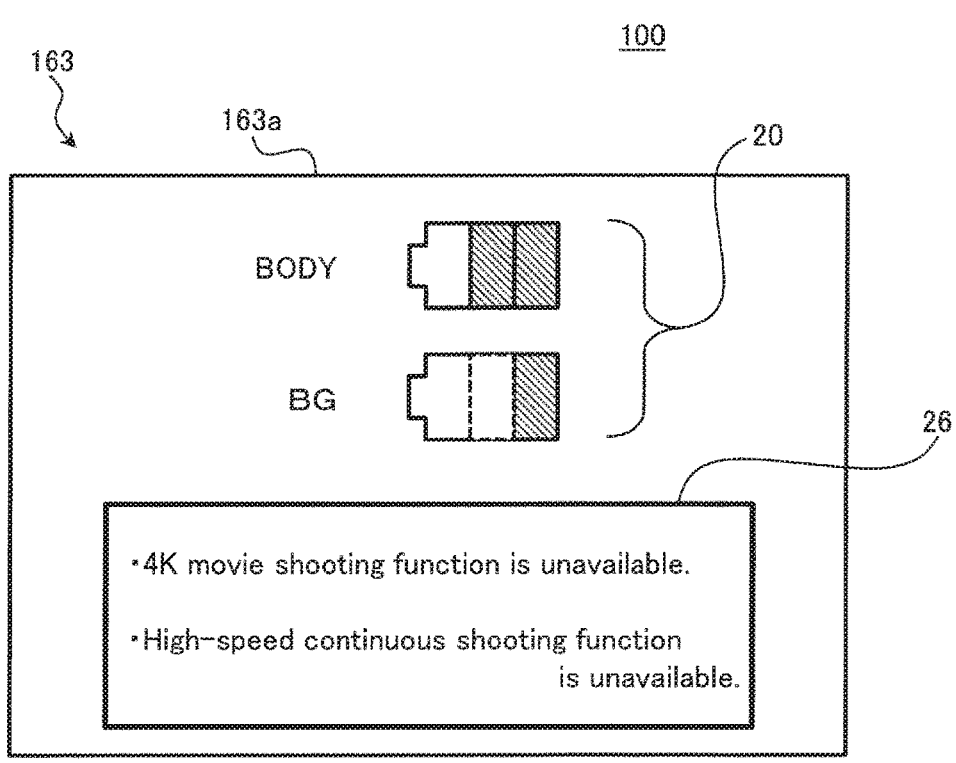
FIG. 10 is a view showing a display example when an alternative function of the digital camera is not selected.
Figure 11:
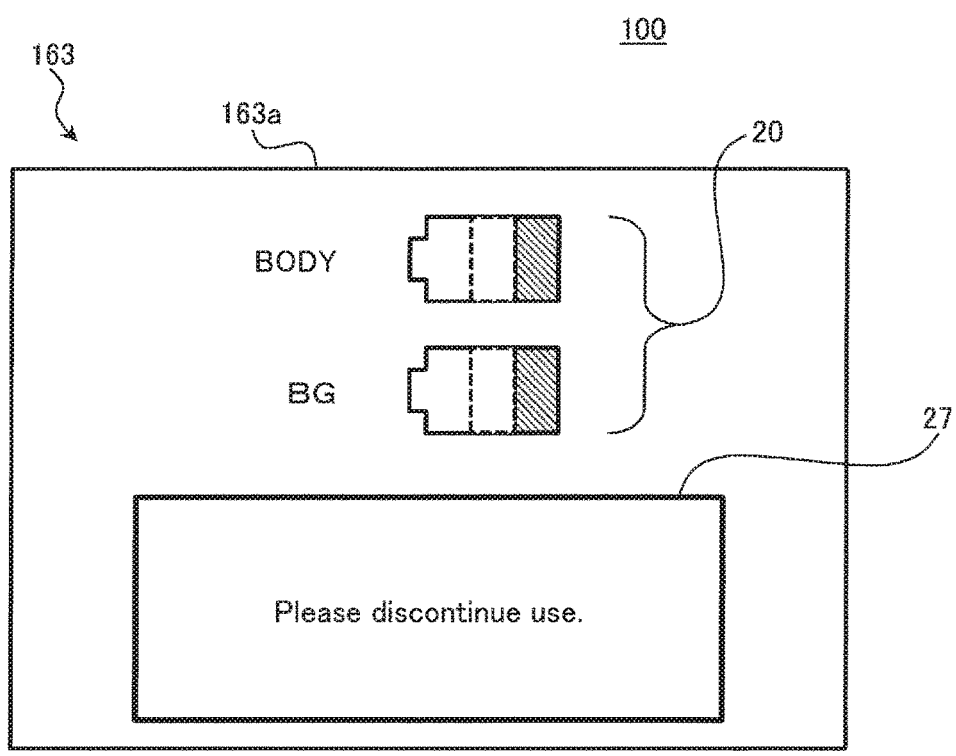
FIG. 11 is a view showing a display example in a state where all functions of the digital camera are unavailable.

On the other hand, when determining that the use of the alternative function is not selected in the user's selection operation (NO in S7), the camera controller 153 does not particularly change the setting as in step S8, but displays a message 26 or the like as shown in FIG. 10 (S10). For example, when "NO" is selected in the switching operation icon 24 of FIG. 8, or when the selection operation is not performed during a predetermined period, the camera controller 153 proceeds to "NO" in step S7.

After the display (S10) in the example of FIG. 10, even if the moving image release button 170e is pressed, shooting of a moving image will not start with the digital camera 100 being in state B where the remaining capacity is insufficient. Also, even if the still image release button 170d is pressed, the shooting function of the digital camera 100 is restricted such that one still image alone can be captured without continuous shooting.

When the digital camera 100 is not in state A where all functions are available (NO in S3) and also not in state B where some function is available (NO in S4), the state corresponds to state C where all the functions are unavailable. In this case, as exemplified in FIG. 11, the camera controller 153 causes the LCD monitor 163 to display a caution message 27 or the like prompting the user to discontinue using the digital camera 100 (S11).

Performing various displays in steps S5 and S9 to S11, the camera controller 153 ends the processing according to this flowchart, for example, after a predetermined period indicating timeout, or by pressing of the Fn button 170f again. Thereafter, the camera controller 153 returns to the display of the live view function, and performs step S1 again at a predetermined cycle, for example.

According to the above processing, by displaying 20 to 27 of various kinds of information 20 to 27 according to the current remaining capacity of the batteries 201 and 202 of the digital camera 100 (S5, S6, and S9 to S11), the user can confirm the situation such as the presence or absence of the functional restriction, which is difficult to grasp with one battery icon 61. The various information 20 to 27 in the above processing each are an example of the attention information in the present embodiment.

In particular, when there is a shooting function unavailable with the current remaining capacity of the batteries 201 and 202 (NO in S3), the user can specifically confirm the unavailable shooting function in the unavailable function list 22 of FIG. 8 or the like (S6). For example, when the user's desired shooting function is listed in the unavailable function list 22, the user can understand that the remaining capacity is insufficient, and can be promoted to exchange of any of the batteries 201 and 202. Further, it is also possible to meet a desire of a user who has a plurality of digital cameras 100, for example. That is, according to confirming that the digital camera 100 in use is unable to perform shooting with the desired shooting function, the user can use another one of the digital cameras 100. As described above, making it possible to confirm in advance that a specific shooting function is currently not executable can facilitate to utilize the digital camera 100 for the user.

Further, by presenting an alternative function to the user in the alternative function list 23 or the like (S6), the user can also select a shooting function that can be used instead of the currently unavailable shooting function. For example, when "Yes" is selected by the switching operation icon 24 in the example of FIG. 8, and then the moving image release button 170e is pressed, it is possible to shoot an FHD moving image. According to receiving a selection operation such as the switching operation icon 24 when the user confirms the functional restriction (S7) and automatically updating the setting change (S8), the digital camera 100 can be made easy to use by eliminating the time and effort for the user to go deeper on the setting menu and reset the setting separately.

In the above description, pressing of the Fn button 170*f* is exemplified as the user operation for checking a remaining capacity in step S1. The user operation for checking a remaining capacity is not particularly limited to the above operation, and may be, for example, a touch operation on the touch panel. For example, the camera controller 153 may proceed to YES in step S1 by detecting that the battery icon 61 in FIG. 4 is touched.

In the above description, an example of confirming functional restriction of the shooting function of the digital camera 100 has been described. The processing of FIG. 5 is applicable to various functions that are unavailable due to an insufficient remaining capacity of the batteries 201 and 202, without being particularly limited to the shooting function.

The various information 20 to 27 described above are examples, and the present disclosure is not particularly limited to these. The displays of the various messages 21, 25 to 27 (S5, S9 to S11) may be omitted as appropriate. For example, even if the processing of FIG. 5 ends without displaying the message 21 in step S5, the user can grasp that there is no function that is currently unavailable.

Moreover, in the above description, an example is described in which the remaining capacities of the two batteries 201 and 202 are displayed in step S2. Timing of the above display may be, for example, simultaneous with steps S5, S6, S11, and the like. Moreover, the remaining capacity indicator 20 of the two batteries 201 and 202 does not necessarily need to be displayed. Even in this case, the user can grasp the presence or absence of the functional restriction, for example, by the presence or absence of the display of the unavailable function list 22.

In the description of steps S3 and S4 above, a method of determining a state of functional restriction of the digital camera 100 by using the table of FIG. 6 has been exemplified, but various determination methods can be adopted without limiting to this. For example, more states than the three states A, B, and C may be set. For example, state B where just some function is unavailable may be subdivided in accordance with a type of the unavailable function. Further, the remaining capacity of each of the batteries 201 and 202 is not particularly limited to three stages. In addition, the camera controller 153 may perform a process of searching for an unavailable function on the basis of the current remaining capacity acquired in step S2.

In step S7 above, an example has been described in which the alternative functions are collectively selected, but the selection operation of the alternative functions may be performed individually. For example, the switching operation icon 24 may be configured to receive the user's selection operation for each function listed in the unavailable function list 22, such as being movable by the upper button and the lower button of the cross button 170*a* or the like. In this case, the camera controller 153 updates the setting of the function for which "Yes" is selected, by the switching operation icon 24 in the digital camera 100.

3. Summary

As described above, the digital camera 100 according to the present embodiment is an example of an imaging apparatus that is mounted with at least one of the batteries 201 and 202 and captures an object image to generate image data. The digital camera 100 includes the operation member 170, the LCD monitor 163 that is an example of a display, and the camera controller 153 that is an example of a processor. The operation member 170 receives a user operation. The LCD monitor 163 displays information on settings of the digital camera 100. The camera controller 153 controls the LCD monitor 163 on the basis of the user operation input to the operation member 170. The digital camera 100 has a plurality of functions to be executed using battery power. When a user's predetermined operation is input to the operation member 170 in a state where the plurality of functions are not executed (YES in S1), the camera controller 153 causes the LCD monitor 163 to display the various information 20 to 27 (S5, S6, and S11) as attention information indicating whether the plurality of functions include an inexecutable function that is not executable due to an insufficient remaining capacity of each of the batteries 201 and 202. The predetermined operation is, for example, an operation for checking information on the remaining capacity of each of the batteries 201 and 202.

According to the above digital camera 100, when the user performs the operation for checking information on the remaining capacity of each of the batteries 201 and 202 before shooting by the digital camera 100 and the like, the attention information is displayed indicating whether or not there is a function that is not executable due to an insufficient remaining capacity. As a result, it is possible for the user to easily grasp a function of the digital camera 100 restricted in accordance with the remaining capacity of the batteries 201 and 202.

In the present embodiment, the unavailable function list 22 as an example of the attention information lists the inexecutable functions that are not executable with the remaining capacity of each of the batteries 201 and 202 when the user operation for checking a remaining capacity is input (see FIG. 8). This allows the user to specifically grasp a currently unavailable function.

In the present embodiment, the alternative function list 23 as an example of attention information presents alternative functions that are executable with a current remaining capacity instead of the functions listed in the unavailable function list 22, that is, functions that are not executable with the current remaining capacity (see FIG. 8). As a result, when there is a function that is not executable, an alternative function is presented, and the user can easily use the digital camera 100.

In the present embodiment, the operation member 170 receives a selection operation for selecting whether or not to use the presented alternative function instead of the inexecutable function based on the remaining capacity of each of the batteries 201 and 202 (S7). The camera controller 153 controls the setting of the digital camera 100 in accordance with the selection operation (S8). Thus, when the user selects to use the alternative function, the setting of the digital camera 100 is automatically updated, and the usability of the digital camera 100 can be improved.

In the present embodiment, the remaining capacity indicator 20 as an example of the attention information includes the remaining capacity of the individual batteries 201 and 202 in the battery used in the digital camera 100 (see FIGS. 7 to 11). This allows the user to grasp which battery has an insufficient remaining capacity and the like, and the digital camera 100 can be easily used.

In the present embodiment, the battery used in the digital camera 100 includes the body battery 201 (first battery) and the BG battery 202 (second battery). The LCD monitor 163 displays the battery icon 61 indicating a remaining capacity of the body battery 201, without displaying a remaining capacity of the BG battery 202, when displaying an object image such as the through image 60 at the live view and the like (FIG. 4). This makes it possible to avoid complication of the display on the LCD monitor 163.

In the present embodiment, the body battery 201 is provided inside the digital camera 100. The BG battery 202 is provided to the battery grip 103, which is an example of an external device attachable to the digital camera 100. By preferentially using the BG battery 202 in the battery grip 103, which can be replaced easily, power of the digital camera 100 can be efficiently used.

OTHER EMBODIMENTS

As described above, the first embodiment has been described as an example of the technique disclosed in the present application. However, the technique in the present disclosure is not limited to this, and can also be applied to embodiments in which change, replacement, addition, omission, and the like are made as appropriate. Further, it is also possible to combine each constituent element described in the first embodiment above to provide a new embodiment. Accordingly, other embodiments will be exemplified below.

In the first embodiment described above, the unavailable function list 22 listing functions that are not executable with the current remaining capacity of each of the batteries 201 and 202 has been exemplified as an example of the attention information. The attention information in the present embodiment is not particularly limited to the above, and it is possible to adopt information indicating whether or not there is a function that is not executable with the current remaining capacity in various aspects. For example, the attention information of the present embodiment may enumerate, for example, functions that are executable with the current remaining capacity, instead of enumerating functions that are not executable. The functions to be enumerated may be appropriately limited, such as the functions currently set in the digital camera 100, for example. Further, the attention information of the present embodiment may display a function that is executable and a function that is not executable with the current remaining capacity in different display modes. For example, the function that is not executable may be grayed out.

In each of the above embodiments, an example has been described in which a predetermined operation at the time of displaying the attention information is the operation for checking the information on the remaining capacity of each of the batteries 201 and 202 (S1), but the predetermined operation is not limited to the above example. For example, the predetermined operation may be an operation for checking whether or not it is possible to use a desired function that the user desires to execute from now.

As an example of the processing described above, the camera controller 153 receives the above user operation instead of step S1 in processing in which steps S5, S6, S11, and the like are omitted in the flowchart of FIG. 5, for example. In response to the input of the user operation, the camera controller 153 displays the attention information described above, performs the same processing as steps S7 to S10, and controls the setting of the digital camera 100 in accordance with the user's selection operation. For example, when the user selects automatic setting for the alternative function (YES in S7), the camera controller 153 updates the setting of the digital camera 100 (S8).

The above embodiments is shown as an aspect in which it is determined whether or not to set an unavailable function to an alternative function (step S7) at a stage after step S6, but the present disclosure is not limited to this. For example, an aspect may be adopted in which the user can select at a stage before step S1 (that is, initial settings or presets) whether or not to set the unavailable function to the alternative function automatically in the menu screen or the like. In this case, the setting information as to whether or not to set the unavailable function to the alternative function is held when the power of the digital camera 100 is turned off. That is, when the power of the digital camera 100 is turned on again, the setting information as to whether or not to set the unavailable function to the alternative function is retained as before the power of the digital camera 100 is turned off. The attention information in this case is, for example, information for confirming whether or not to use a corresponding alternative function instead of a function that becomes unavailable when the current remaining capacity of each of the batteries 201 and 202 decreases, similarly to the switching operation icon 24 described above.

As described above, the attention information may be information for confirming, instead of a function that is not executable with a remaining capacity of each of the batteries 201 and 202 when a user operation is input, whether or not to use a function that is executable with the remaining capacity. The camera controller 153 may control the setting of the digital camera 100 in accordance with the user operation of selecting whether or not to use the function that is executable in the attention information. This also makes it easier for the user to use the digital camera 100, regarding functions restricted in accordance with the remaining capacity of the batteries 201 and 202.

In the above embodiments, the digital camera 100 mounted with the two batteries 201 and 202 has been described. The digital camera 100 of the present embodiment may be an imaging apparatus mounted with three or more batteries, or may be an imaging apparatus mounted with one battery alone. Even in these cases, an inexecutable function occurs due to an insufficient remaining capacity of the battery. Accordingly, as in the first embodiment, the digital camera 100 of the present embodiment enables to make it easy for a user to grasp a function of the imaging apparatus restricted in accordance with the remaining capacity of the battery, by displaying attention information.

In the above embodiments, the lens interchangeable digital camera has been described as an example of the imaging apparatus. However, the imaging apparatus of the present embodiment may be a digital camera that is not particularly the lens interchangeable type. Further, the concept of the present disclosure is applicable not only to digital cameras but also to various electronic devices to which a plurality of batteries can be connected, such as movie cameras, mobile phones with cameras, and personal computers.

As described above, the embodiments have been described as examples of the technique in the present disclosure. For this purpose, the accompanying drawings and the detailed description have been provided.

Accordingly, some of the constituent elements described in the accompanying drawings and the detailed description may also include constituent elements that are not indispensable for solving the problem in order to exemplify the above technique in addition to indispensable constituent elements for solving the problem. Therefore, these constituent elements that are not indispensable are not to be immediately recognized to be indispensable on the basis of the fact that these constituent elements that are not indispensable are described in the accompanying drawings or the detailed description.

In addition, since the above-described embodiments are intended to exemplify the technique in the present disclosure, it is possible to make various changes, replacements, additions, omissions, and the like within the scope of claims or the equivalent thereof.

The present disclosure is applicable to electronic devices to which batteries can be connected, such as digital cameras, movie cameras, and mobile phones with cameras.

The invention claimed is:

1. An imaging apparatus that can be mounted with at least one battery, for capturing an object image to generate image data, the imaging apparatus comprising:
   a user interface configured to input an operation of a user;
   a display configured to display information on a setting of the imaging apparatus; and
   a processor configured to control the display based on the user operation input to the user interface, wherein
   the imaging apparatus has a plurality of functions to be executed using power of the battery, and
   the processor causes the display to display attention information including a list of functions showing presence or absence of an inexecutable function in the plurality of functions due to an insufficient remaining capacity of the battery, when a predetermined operation is input to the user interface in a state where the plurality of functions are not executed.

2. The imaging apparatus according to claim 1, wherein the attention information lists the inexecutable function that is not executable based on a capacity of the battery remaining when the predetermined operation is input.

3. The imaging apparatus according to claim 2, wherein the attention information presents a function that is executable with the remaining capacity of the battery, instead of the inexecutable function based on the remaining capacity.

4. The imaging apparatus according to claim 3, wherein the user interface receives a selection operation for selecting whether or not to use a presented function instead of the inexecutable function based on the remaining capacity of the battery, and
   the processor controls a setting of the imaging apparatus in accordance with the selection operation.

5. The imaging apparatus according to claim 1, wherein the attention information is information for confirming whether or not to use, instead of the inexecutable function based on a capacity of the battery remaining when the predetermined operation is input, a function that is executable with the remaining capacity, and
   the processor controls a setting of the imaging apparatus in accordance with an operation for selecting whether or not to use the function that is executable in the attention information.

6. The imaging apparatus according to claim 1, wherein the predetermined operation is an operation for checking information on the remaining capacity of the battery.

7. The imaging apparatus according to claim 1, wherein the attention information includes a remaining capacity of an individual battery in the at least one battery.

8. The imaging apparatus according to claim 1, wherein the at least one battery includes a first battery and a second battery, and
   the display displays an icon indicating a remaining capacity of the first battery without displaying a remaining capacity of the second battery when displaying the object image.

9. The imaging apparatus according to claim 8, wherein the first battery is provided inside the imaging apparatus, and
   the second battery is provided to an external device attached to the imaging apparatus.

10. An imaging apparatus that can be mounted with at least one battery, for capturing an object image to generate image data, the imaging apparatus comprising:
    a user interface configured to input an operation of a user;
    a display configured to display information on a setting of the imaging apparatus; and
    a processor configured to control the display based on the user operation input to the user interface, wherein
    the imaging apparatus has a plurality of functions to be executed using power of the battery, and
    the processor causes the display to display attention information including a list of functions among the plurality of functions which are executable based on a remaining capacity of the battery, and/or a list of functions among the plurality of functions which are inexecutable based on a remaining capacity of the battery, when a predetermined operation is input to the user interface in a state where the plurality of functions are not executed.

* * * * *